(12) United States Patent
Mardilovich et al.

(10) Patent No.: US 7,045,234 B2
(45) Date of Patent: May 16, 2006

(54) FUEL-CELL INTEGRAL MULTIFUNCTION HEATER AND METHODS

(75) Inventors: Peter Mardilovich, Corvallis, OR (US); Gregory S Herman, Albany, OR (US); David Champion, Lebanon, OR (US); James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 10/219,507

(22) Filed: Aug. 14, 2002

(65) Prior Publication Data

US 2004/0033401 A1    Feb. 19, 2004

(51) Int. Cl.
*H01M 8/04* (2006.01)
(52) U.S. Cl. ............................................ 429/24
(58) Field of Classification Search ................. 429/26, 429/24, 30; 136/225
See application file for complete search history.

(56) References Cited

U.S. PATENT DOCUMENTS

| | | | |
|---|---|---|---|
| 1,289,116 A * | 12/1918 | Chub | 136/233 |
| 4,548,875 A | 10/1985 | Lance et al. | |
| 5,429,886 A | 7/1995 | Struthers | |
| 5,641,585 A | 6/1997 | Lessing et al. | |
| 5,753,385 A | 5/1998 | Jankowski et al. | |
| 5,929,319 A | 7/1999 | King et al. | |
| 6,258,474 B1 | 7/2001 | Diethelm et al. | |
| 6,383,672 B1 | 5/2002 | Fujita | |
| 6,638,654 B1 * | 10/2003 | Jankowksi et al. | 429/26 |
| 2002/0048701 A1 | 4/2002 | Ukai et al. | |
| 2002/0068202 A1 | 6/2002 | Gebhardt et al. | |
| 2004/0018406 A1 * | 1/2004 | Herman et al. | 429/26 |

FOREIGN PATENT DOCUMENTS

| | | |
|---|---|---|
| EP | 1271684 | 1/2003 |
| FR | 2008427 | 1/1970 |
| JP | 56-084882 | 7/1981 |
| JP | 61045569 | 7/1986 |
| JP | 64-076671 | 3/1989 |
| JP | 07-201348 | 8/1995 |
| WO | WO 00/45457 A3 | 8/2000 |
| WO | WO0045457 | 8/2000 |
| WO | WO0201662 | 1/2002 |

* cited by examiner

*Primary Examiner*—Patrick Joseph Ryan
*Assistant Examiner*—Thomas H. Parsons

(57) ABSTRACT

A fuel cell or battery has an integral multifunction heater element operable as an integral heater, an integral temperature sensor, and/or an integral aid to current collection from the fuel cell. The integral multifunction heater element is embedded within the electrolyte, anode, or cathode, disposed in thermal contact with at least one of the electrolyte, anode, or cathode, and is formed of a thin film of material of suitable resistivity, such as a refractory metal or conductive oxide, patterned in a suitable pattern. Conductive terminals provide electrical contact to the thin film. The integral multifunction heater element may include a thermistor or thermocouple. Methods are disclosed for fabricating and using the fuel cell with an integral multifunction heater element.

40 Claims, 3 Drawing Sheets

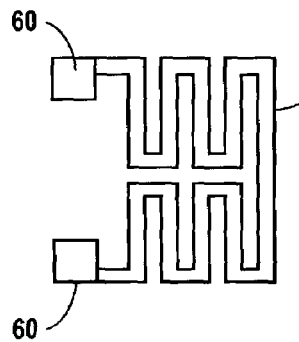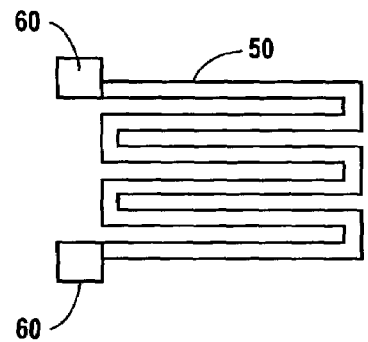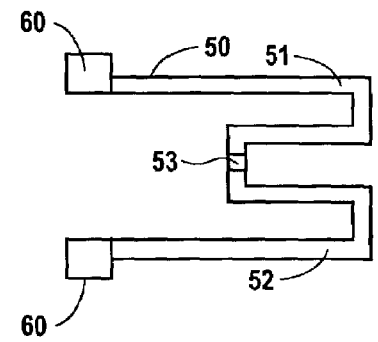
FIG. 3A  FIG. 3B  FIG. 3C
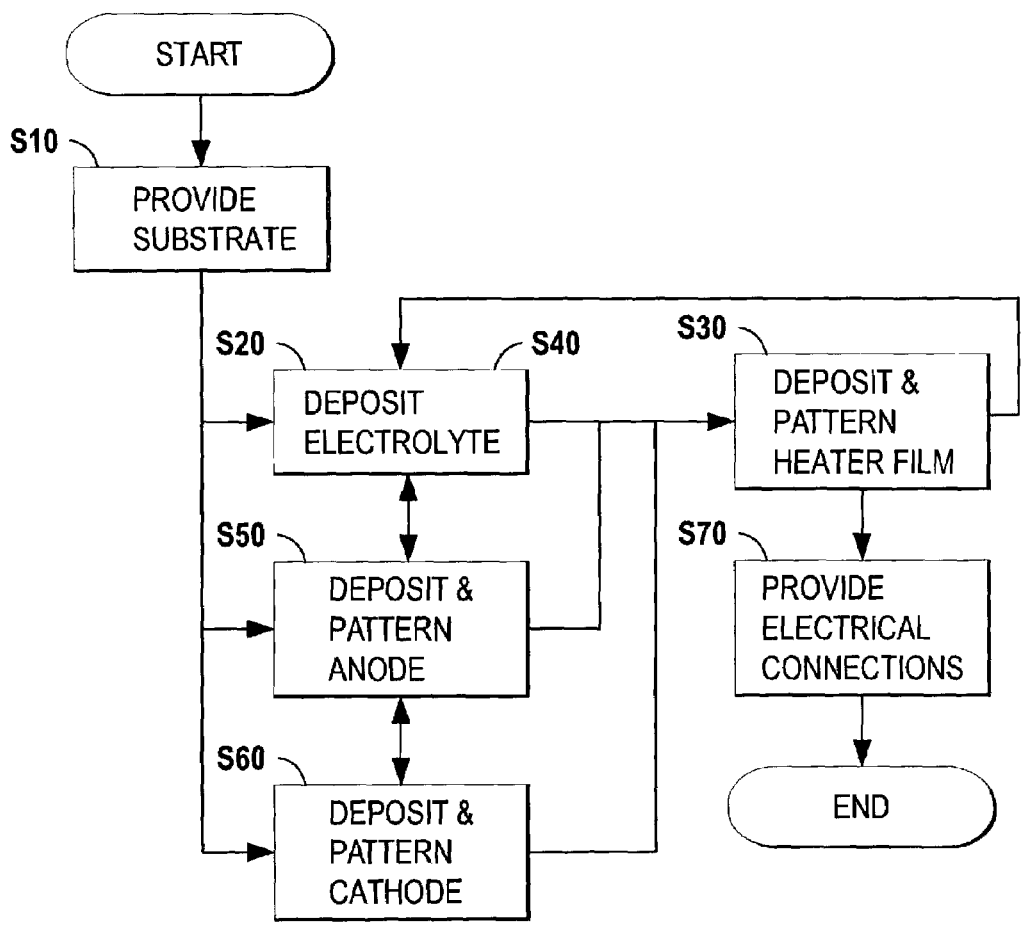
FIG. 4

FUEL-CELL INTEGRAL MULTIFUNCTION HEATER AND METHODS

TECHNICAL FIELD

This invention relates generally to fuel cells, and more particularly to fuel cells having an integral heater element, to electronic devices incorporating such fuel cells, and to methods of fabricating and methods of using such fuel cells.

BACKGROUND

Various portable devices, such as laptop computers, personal digital assistants (PDA's), portable digital and video cameras, portable music players, portable electronic games, and cellular phones or other wireless devices, require portable power sources. The weight and inconveniences of single-use batteries and rechargeable batteries have motivated efforts to replace those power sources for portable use. Thus, there is an increasing demand for light-weight, reusable, efficient, and reliable power sources in such applications and in many other applications as well. In attempts to meet these needs, various portable fuel cells have been developed, such as ceramic-based solid-oxide fuel cells, direct methanol fuel-cell (DMFC) systems, reformed-methanol-to-hydrogen fuel-cell (RMHFC) systems, and other proton-exchange-membrane (PEM) fuel-cell systems. Some fuel-cell designs require heating of the fuel itself or heating of fuel-cell elements for best efficiency, while some fuel-cell designs require cooling. There is a continuing need and a large anticipated market for improved practical compact portable fuel cells with rapid startup times and improved efficiency.

BRIEF DESCRIPTION OF THE DRAWINGS

The features and advantages of the disclosure will readily be appreciated by persons skilled in the art from the following detailed description when read in conjunction with the drawings, wherein:

FIGS. 3A–3C are top plan views of pattern embodiments for an integral multifunction heater element made in accordance with the invention.

FIG. 4 is a flow chart illustrating an embodiment of a method for fabricating fuel cells in accordance with the invention.

Figure 1A:
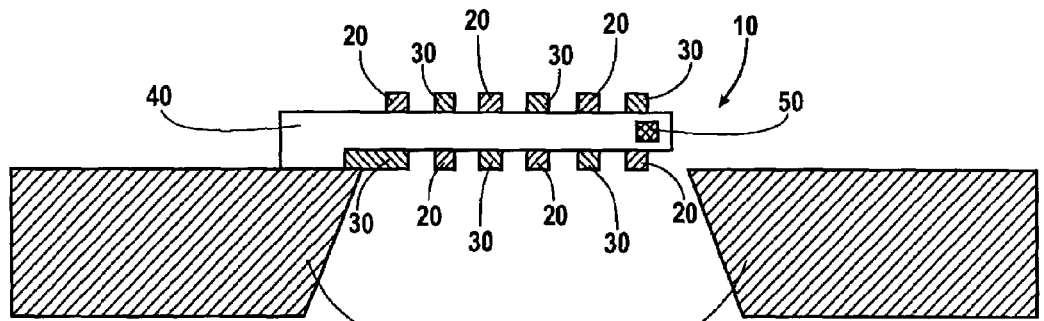
FIGS. 1A–1D are cross-sectional side elevation views of various embodiments exemplifying fuel cells made in accordance with the invention.

For clarity of the description, the drawings are not drawn to a uniform scale. In particular, vertical and horizontal scales may differ from each other and may vary from one drawing to another.

DETAILED DESCRIPTION OF EMBODIMENTS

Throughout this specification and the appended claims, the term "fuel cell" means a fuel cell in its usual meaning or a battery cell having an anode, a cathode, and an electrolyte.

FIGS. 1A–1D and FIGS. 2A–2E show views of various embodiments of a fuel-cell structure 10 having an anode 20, a cathode 30, and an electrolyte 40.

FIGS. 1A–1D are cross-sectional side elevation views of various embodiments, and FIGS. 2A–2E are top plan views of a particular embodiment exemplifying a fuel cell made in accordance with the invention, at various stages of its fabrication. Methods of fabrication are described in detail hereinbelow.

An integral heater element 50 is provided in thermal contact with the electrolyte and embedded within the electrolyte 40, anode 20, or cathode 30. Terminals 60 are electrically coupled to integral heater element 50 for providing heating current for heating electrolyte 40 to a desired temperature before operation and (optionally) during operation of the fuel cell. Integral heater element 50 is a multifunction element in that it can be used, not only to heat the electrolyte 40 (herein referred to as "active mode"), but also to perform as a sensor (herein referred to as "passive mode"). When used as a sensor in the passive mode, integral heater element 50 may be used to sense electrolyte temperature, for example. Terminals 60 may be used to electrically couple integral heater element 50 to resistance-measuring circuitry, voltage-measuring circuitry, and/or to a feedback control system for maintaining electrolyte 40 at an optimum temperature.

Figure 1B:
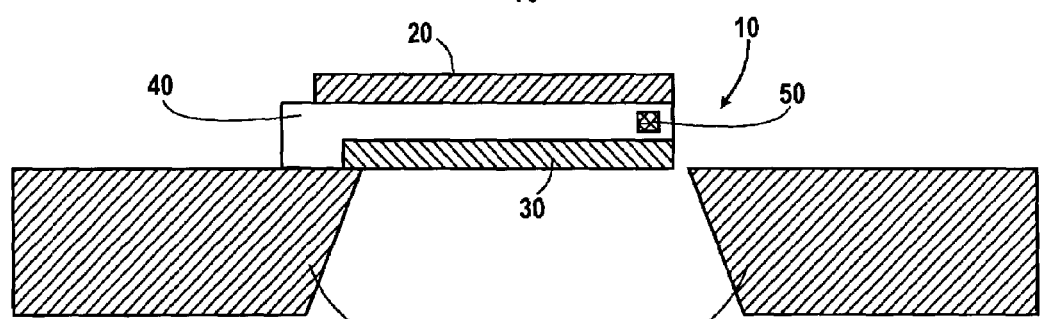
Figure 1C:
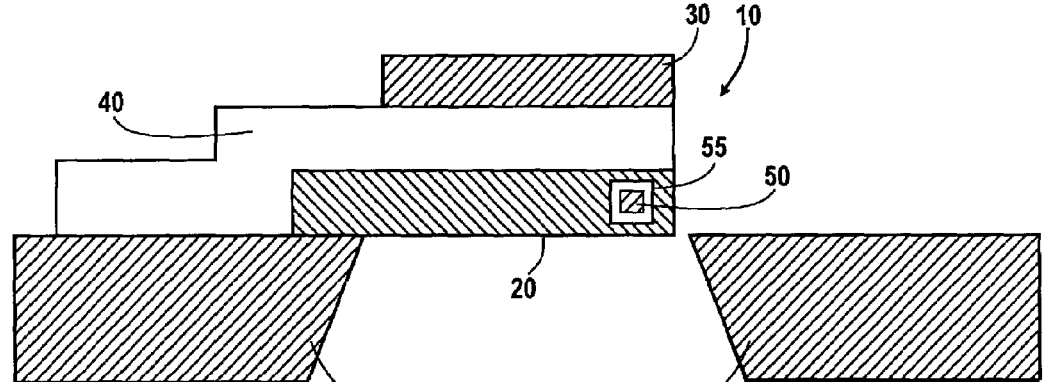
Figure 1D:
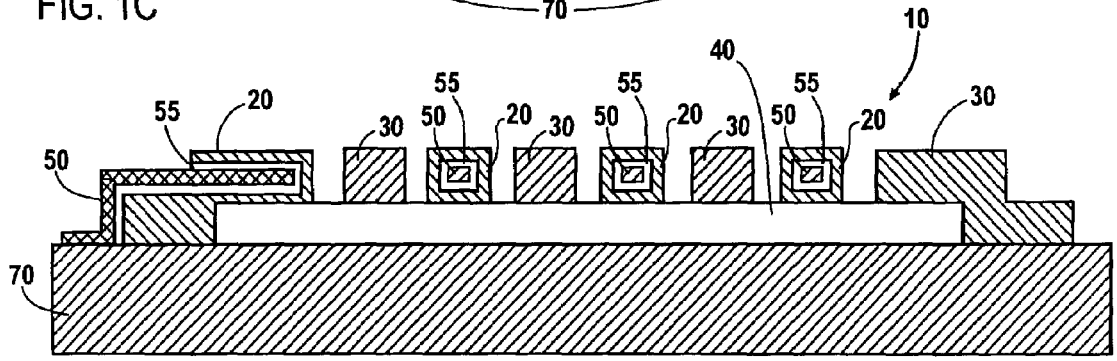

In some embodiments of the invention (cf. FIGS. 1A and 1B), integral heater element 50 may be disposed between anode 20 and cathode 30, e.g., when electrolyte 40 is between anode 20 and cathode 30. Expressed in terms of the thickness of electrolyte 40, integral heater element 50 may be placed entirely within that thickness, and it may be substantially centered between anode 20 and cathode 30. Integral heater element 50 is spaced apart from both anode 20 and cathode 30 to prevent short circuits. However, in some embodiments of the invention, integral heater element 50 may be disposed adjacent to anode 20 or adjacent to cathode 30. Integral heater element 50 may extend over a minor or major portion of the projected area of electrolyte 40 (while leaving as much open area as possible for ionic conduction in the electrolyte, e.g., by including suitable interstices). It may be substantially centered with respect to the projected area of electrolyte 40. If necessary, to insulate integral heater element 50 from the anode and/or cathode, an insulator 55 may be employed, as shown in FIGS. 1C and 1D.

In the embodiments shown in drawing FIGS. 1A–1D and FIGS. 2A–2E, integral heater element 50 comprises a thin film of a material having suitable resistivity, e.g., a refractory metal such as nickel, palladium, platinum, chromium, molybdenum, tungsten, vanadium, niobium, tantalum, rhenium, ruthenium, osmium, rhodium, iridium, or alloys, combinations, or mixtures of such metals.

Such materials are useful in fuel cells such as solid-oxide fuel cells for which operating temperatures can exceed 800° C.

Alternatively, integral heater element 50 may be formed of a conductive oxide. By way of illustrative example, ceramics such as $La(Sr)Cr(Mn)O_3$ and $La(Sr)Cr(Ti)O_3$, where the elements in parentheses are dopants, can be used for the heater. These are suitable "interconnect materials" having high electrical conductivity but low ionic conductivity, and can also be used in the anode, cathode or electrolyte. In situations where one wants to maximize the ionic conductivity through the fuel cell, materials such as $La(Sr)Cr(Mn)O_3$, $La(Sr)Cr(Ti)O_3$, $Sm(Sr)CoO3$, or $La(Sr)Co(Fe)O3$, [where (Sr), (Mn), (Ti), and (Fe) respectively denote dopants], can be used in the cathode and electrolyte, where these materials have both ionic and electrical conductivity.

The thin film of integral heater element 50 is patterned to form, for example, an elongated strip as shown in FIG. 3A arranged in a serpentine pattern, such as a boustrophedonic pattern (like a bidirectional raster pattern) as shown in FIG. 3B. The pattern can be chosen to provide a desired resistance or reactance value and/or to provide coverage of a desired portion of electrolyte 40, e.g., a geometric portion near the center of electrolyte 40, and to allow suitable electrical conduction through electrolyte 40 during operation of fuel cell 10. Thus, if integral heater element 50 is disposed between anode 20 and cathode 30, for example, it may be configured with openings or interstices suitable for allowing ionic current to flow between anode 20 and cathode 30, as shown in the example configurations illustrated in FIGS. 3A–3C.

Fuel cell 10 may include an integral temperature sensor, which may comprise integral heater element 50 itself, or be a distinct element made like integral heater element 50. When used in that manner, the integral temperature sensor may be formed of the same material as integral heater element 50. For example, when integral heater element 50 is not being used to heat electrolyte 40 or other parts of the fuel cell, its resistance may be used as a measure of the fuel cell temperature by virtue of its temperature coefficient of resistance, i.e., it may be used as an integral temperature sensor.

Alternatively, integral heater element 50 may be formed by combining two dissimilar metals in a thermocouple configuration, with which a temperature within the fuel cell may be measured by using the thermocouple contact potential (EMF). That is, integral heater element is formed by two dissimilar metallic portions 51 and 52 joined at a single junction 53. Such a configuration is illustrated by FIG. 3C, in which portions 51 and 52 of integral heater element 50 are made of different metals, and their junction 53 forms the thermocouple junction. Thus, in such an embodiment, integral heater element 50 may be used as an integral temperature sensor, by sensing the thermocouple contact potential in a conventional manner. Similarly, integral heater element 50 may include a thermistor as a temperature-sensing element.

Integral heater element 50 may include a current collector, which may be the integral heater element itself or a distinct element made in the same manner. To provide the function of assisting in collection of current, suitable portions of integral heater element 50 may be made of thicker films and/or be formed of higher conductivity materials, such as silver or gold. Electrical terminals 60 may also be made of thicker films and/or be formed of higher conductivity materials, such as copper, silver, or gold.

Thus, integral heater element 50 is a multi-function element. In an active mode, as an integral heater, it may be used to heat electrolyte 40 and/or other parts of the fuel cell. In a passive mode of operation, it may assist in collection of current from the fuel cell. As a sensor in a passive mode of operation, it may be used to sense electrolyte temperature, for example. Thus, as described above, terminals 60 may be used to electrically couple integral heater element 50 to conventional resistance-measuring circuitry, and/or to a conventional feedback control system for maintaining electrolyte 40 at an optimum temperature. When integral heater element 50 is used in such a temperature control configuration, temperature may be increased by switching integral heater element 50 to active mode heating, and temperature may be decreased by controlling flow rate of fuel, for example.

Thus, each of the embodiments described has an anode, a cathode, an electrolyte, and integral means for heating at least one of those elements (anode, cathode, and electrolyte). The integral means for heating those elements is disposed within the fuel cell and in thermal contact with at least one of the elements (anode, cathode, and electrolyte). Each of the embodiments also includes means for providing heating current, for heating before operation, and optionally for heating during operation of the fuel cell.

The structures of fuel cell embodiments disclosed herein are specially adapted for fabrication by specific methods described in the following detailed description and by the appended claims and their equivalents.

Fabrication Methods

FIG. 4 is a flow chart in which steps are denoted by reference numerals S10, . . . , S70, illustrating an embodiment of an overall method for fabricating fuel cells in accordance with the invention. Arrows indicate various alternate paths through the flow chart. One skilled in the art will recognize that embodiments of the invention may be made by following various paths through the flow chart, depending on the specific structure embodiment desired. The following description describes a sequence for an exemplary embodiment.

Figure 2A:
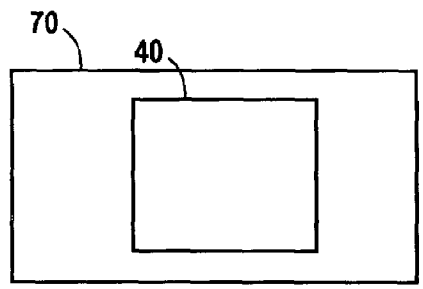
FIGS. 2A–2E are top plan views of a particular embodiment exemplifying a fuel cell made in accordance with the invention, at various stages of its fabrication.

A suitable substrate 70 is provided (SI 0) for formation of a fuel cell, and a layer of electrolyte 40 is deposited (S20) upon substrate 70. Substrate 70 may be a silicon wafer, an oxidized silicon wafer, a smooth, flat ceramic plate or other dielectric substrate, or a metallic plate, for example. A top plan view of electrolyte 40 on substrate 70 is shown in FIG. 2A. Electrolyte 40 may be deposited through a mask to define its extent on substrate 70. Electrolyte 40 is any suitable electrolyte. One skilled in the art will recognize that a variety of electrode and electrolyte materials may be exploited for use with the invention. For example, cubic fluorites such as Sm- or Gd-doped $CeO_2$ and yttria-stabilized zirconia (YSZ), e.g., 8 mole % yttria), doped perovskite oxides such as $La_{0.9}Sr_{0.1}Ga_{0.8}Mg_{0.2}O_3$, proton-conducting perovskites such as $BaZrO_3$, $SrCeO_3$, and $BaCeO_3$, other proton-exchange ceramics, or ion-conductive polymers such as a perfluorosulfonic acid resin membrane (e.g., Nafion™, available from DuPont Chemicals, Inc., Wilmington, Del.) may be used as electrolytes in fuel cells made in accordance with the invention.

Figure 2B:
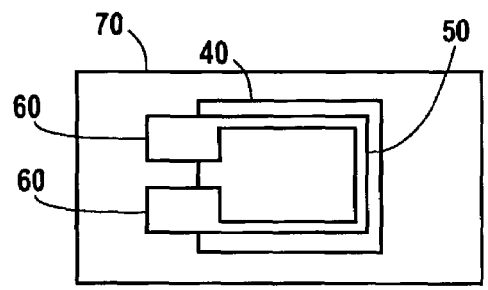
Figure 2C:
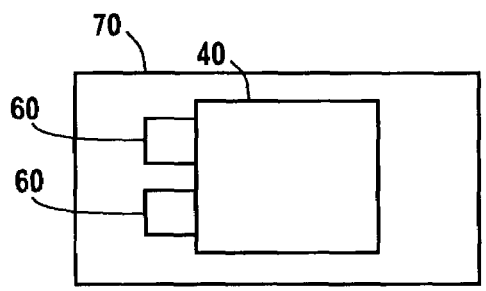

A thin heater film is deposited and patterned (S30) to form integral heater element 50. As described above, integral heater element 50 can comprise a film of platinum or another refractory metal such as nickel, palladium, chromium, molybdenum, tungsten, or an alloy, combination, or mixture of such metals, or conducting oxides. FIG. 2B shows integral heater 50 after deposition and patterning. Integral heater element 50 is embedded within electrolyte 40 in the embodiments of FIGS. 1B and 2E. Optionally, another layer of electrolyte 40 may be deposited (S40) over the heater film so that integral heater element 50 is disposed entirely within the thickness of a thicker electrolyte. If the two layers of electrolyte are of about equal thicknesses, integral heater element 50 will be disposed in about the center of the resultant electrolyte thickness.

Figure 2D:
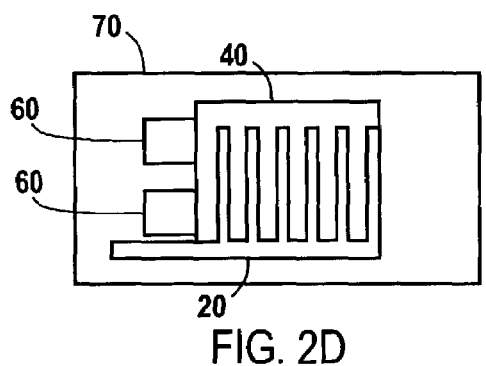

In step S50, an anode film is deposited and patterned to form anode 20, as shown in FIG. 2D. Metallic cathodes and anodes, e.g., silver and nickel, may be employed. Cermets such as Ni—YSZ, and Cu—YSZ (catalyst-electrolyte), or Ni or Cu modified doped ceria (e.g., $Ce_{0.8}Sm_{0.2}O_{1.9}$, $Ce_{0.9}Gd_{0.1}O_{1.9}$) may be employed as anode materials. Exemplary cathodes include doped perovskites, such as $Sm_{0.5}Sr_{0.5}CoO_3$, $Ba_{0.8}La_{0.2}CoO_3$, and $Gd_{0.5}Sr_{0.5}CoO_3$. Alternatively, the B sites of these perovskites may be doped, for example, with Fe or Mn. The electrolyte, cathode, and anode may be porous or dense. As the term "dense" is used herein, a dense material has at least 80% of its theoretical density.

Figure 2E:
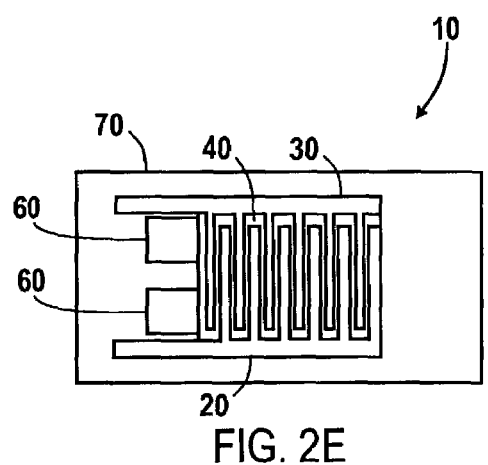

In step S60, a cathode film is deposited and patterned to form cathode 30, as shown in FIG. 2E. Thus, a fuel-cell structure 10 has been formed on substrate 70 by performing the sub-steps S10–S60. Such a structure is shown in cross-section in FIG. 1D.

In step S70, electrical connections are provided by depositing (and, if necessary, patterning) conductive terminal electrodes or pads 60 in electrical contact with the thin film of integral heater element 50. Terminal electrodes 60 may be formed of relatively thicker films of highly conductive materials, such as copper, silver, or gold, with appropriate conventional interfacial metallurgy if required.

For some embodiments, an additional step may be performed of etching away at least a portion of substrate 70 under the fuel-cell structure to leave the fuel-cell structure supported in membrane form. Such embodiments are shown in FIGS. 1A, 1B, and 1C. To facilitate this method, the substrate may include a sacrificial layer (not shown) that is removed (e.g., by etching) to leave the fuel-cell structure supported in membrane form. If the etching is performed while leaving the fuel-cell structure supported by only one edge, then the resultant fuel-cell structure is cantilevered as shown in FIGS. 1A–1C.

Materials such as $La(Sr)Cr(Mn)O_3$, $La(Sr)Cr(Ti)O_3$, $Sm(Sr)CoO3$, $La(Sr)Co(Fe)O3$, where the elements in parentheses are dopants, can be used in the cathode and electrolyte. These materials have both ionic and electrical conductivity.

It will be recognized that a number of fuel cell structures made in accordance with the invention may be combined, e.g., by stacking them electrically coupled in series, in parallel, or in series-parallel combinations to provide a desired voltage, current-delivery capability, or energy. An electronic device may incorporate one fuel cell structure, a number of independent fuel cell structures, or a combination consisting of a number of fuel cell structures electrically coupled. Such a device may be made with a single fuel supply shared by the various component fuel cells.

Such electronic devices can include any of the portable devices mentioned hereinabove, other portable devices, and also non-portable devices, such as uninterruptible power supplies.

The embodiments disclosed also demonstrate new and useful methods of operating and using a fuel cell. A fuel cell having an anode, a cathode, and an electrolyte, is provided with an integral heater element embedded in and disposed in thermal contact with at least one of the elements (electrolyte, anode, and cathode). The integral heater element has electrical terminals for providing current for heating at least a portion of the fuel cell to a desired temperature before operation, and optionally, during operation of the fuel cell. In an active mode of operation, the fuel cell is heated by feeding current to the integral heater element. In some embodiments, this heating may be limited to an initial startup interval. Thus, a method of operating a fuel cell in accordance with the invention (including introducing fuel into the fuel cell) can include providing heating current for an initial time interval. The initial time interval can begin about the time fuel is first introduced into the fuel cell or just before fuel flow starts.

In a passive mode the same integral heater element or a distinct integral element of similar construction is used as a sensor, sensing fuel cell internal temperature. The internal temperature measured is localized at least within the interior of the fuel cell, or even more locally within the electrolyte portion, the anode, or the cathode of the fuel cell. The sensor signal (e.g., resistance or thermocouple EMF) is used by a conventional feedback control system to control heating current supplied to the integral heater element in its active mode, and optionally to control other fuel-cell operating parameters such as fuel supply rate. Thus a fuel cell's internal temperature, using a localized temperature measurement, can be controlled with a fast response time, to achieve and maintain a desired temperature. The temperature setpoint can be chosen for maximum fuel-cell efficiency, minimum startup time, or any suitable desired criterion.

INDUSTRIAL APPLICABILITY

Fuel cell integral multifunction heater elements made in accordance with the invention are useful in fuel cells of various types, for improved fuel cell efficiency, for accurately localized temperature sensing within fuel cells, for current collection, and for rapid automatic temperature control of fuel cells. Fuel cells made in accordance with the invention can include, for example, solid oxide fuel cells and other fuel cells in which operating temperatures can exceed 800° C.

Specially adapted methods performed in accordance with the invention are useful in efficient batch fabrication of fuel cells and in use of such fuel cells, which, conversely, have a structure specially adapted for such methods.

Although the foregoing has been a description and illustration of specific embodiments of the invention, various modifications and changes thereto can be made by persons skilled in the art without departing from the scope and spirit of the invention as defined by the appended claims.

What is claimed is:

1. A fuel cell having an anode, a cathode, and an electrolyte, said fuel cell comprising:
   a multifunction integral heater element embedded within at least one of said electrolyte, anode, and cathode, and disposed in thermal contact with at least one of said electrolyte, anode, and cathode, the multifunction integral heater element including an integral temperature sensor, and
   terminals electrically coupled to said integral heater element for providing heating current for heating said electrolyte to a desired temperature before operation and during operation of said fuel cell.

2. The fuel cell of claim 1, wherein said integral heater element is disposed between said anode and said cathode.

3. The fuel cell of claim 2, wherein said integral heater element is configured with interstices for allowing ionic current to flow between said anode and said cathode.

4. The fuel cell of claim 1, wherein said integral heater element is spaced apart from said anode.

5. The fuel cell of claim 1, wherein said integral heater element is spaced apart from said cathode.

6. The fuel cell of claim 1, wherein said integral heater element is disposed adjacent to said anode.

7. The fuel cell of claim 1, wherein said integral heater element is disposed adjacent to said cathode.

8. The fuel cell of claim 1, wherein said electrolyte has a projected area and said integral heater element extends over a minor portion of said projected area of said electrolyte.

9. The fuel cell of claim 1, wherein said electrolyte has a projected area and said integral heater element is substantially centered with respect to said projected area of said electrolyte.

10. The fuel cell of claim 1, wherein said electrolyte has a thickness and said integral heater element is disposed entirely within said thickness of said electrolyte.

11. The fuel cell of claim 1, wherein said electrolyte has a thickness and said integral heater element is substantially centered within said thickness of said electrolyte.

12. The fuel cell of claim 1, wherein said integral heater element comprises a thin film of a material having suitable resistivity.

13. The fuel cell of claim 12, wherein said material of said thin film comprises a refractory metal.

14. The fuel cell of claim 12, wherein said material of said thin film is selected from the list consisting of nickel, palladium, platinum, chromium, molybdenum, tungsten, vanadium, niobium, tantalum, rhenium, ruthenium, osmium, rhodium, iridium, and alloys, combinations, and mixtures thereof.

15. The fuel cell of claim 12, wherein said material of said thin film is a conductive oxide.

16. The fuel cell of claim 12, wherein said material of said thin film is a ceramic material.

17. The fuel cell of claim 16, wherein said ceramic material is selected from the list consisting of La(Sr)Cr(Mn)$O_3$, La(Sr)Cr(Ti)$O_3$, Sm(Sr)CoO3, La(Sr)Co(Fe)O3, wherein (Sr), (Mn), (Ti), and (Fe) respectively denote dopants.

18. The fuel cell of claim 12, wherein a portion of said material of said thin film is a metal selected from the list consisting of copper, silver, gold, and alloys, combinations, and mixtures thereof.

19. The fuel cell of claim 12, wherein said thin film is patterned.

20. The fuel cell of claim 19, wherein said patterned thin film forms an elongated strip.

21. The fuel cell of claim 19, wherein said patterned thin film forms a serpentine pattern.

22. The fuel cell of claim 19, wherein said patterned thin film forms a boustrophedonic pattern.

23. The fuel cell of claim 1, wherein said integral temperature sensor comprises a thermistor.

24. The fuel cell of claim 1, wherein said integral heater element is formed by two dissimilar metallic portions joined at a single junction, whereby said integral temperature sensor is configured as a thermocouple.

25. The fuel cell of claim 1, wherein said integral heater element includes a current collector.

26. The fuel cell of claim 1, further comprising a current collector.

27. The fuel cell of claim 26, wherein said current collector comprises said integral heater element.

28. An electronic device, comprising the fuel cell of claim 1.

29. The electronic device of claim 28, further comprising a system for controlling said integral heater element to achieve and maintain said desired temperature.

30. The electronic device of claim 29, wherein said system for controlling said integral heater element uses feedback to achieve and to maintain said desired temperature.

31. A fuel cell having an anode, a cathode, and an electrolyte, said fuel cell comprising:

a multifunction integral heater element embedded in said electrolyte, in thermal contact with said electrolyte, and disposed between said anode and said cathode, said multifunction integral heater element comprising a thin film of a material having suitable resistivity, said multifunction integral heater element including an integral temperature sensor, and terminals electrically coupled to said multifunction integral heater element for providing heating current through said thin film for heating said electrolyte to a desired temperature before operation and during operation of said fuel cell.

32. The fuel cell of claim 31, further comprising a feedback control system responsive to said integral temperature sensor to control said multifunction integral heater element for achieving and maintaining said desired temperature.

33. A fuel cell comprising:

an anode, a cathode, an electrolyte, integral means for heating at least one of said anode, cathode, and electrolyte, said integral means for heating being disposed within said fuel cell and embedded in thermal contact with at least one of said anode, cathode, and electrolyte, said integral means for heating including integral means for sensing a temperature within said fuel cell, and means for providing heating current to said integral means for heating before operation and during operation of said fuel cell.

34. The fuel cell of claim 33, further comprising means for controlling said temperature to a desired temperature, said means for controlling being responsive to said temperature within said fuel cell.

35. The fuel cell of claim 33, further comprising means for controlling said integral means for heating, for achieving and maintaining a desired temperature.

36. The fuel cell of claim 33, wherein said integral means for heating further comprises means for collecting current generated by said fuel cell.

37. A multifunction heater element for a fuel cell having an anode, a cathode, and an electrolyte, said multifunction heater element comprising:

a) a patterned thin film of resistive material, and
b) an integral temperature sensor,
both said thin film and said integral temperature sensor being adapted to be disposed in thermal contact with at least one of said anode, cathode, and electrolyte, thereby being integral with the fuel cell, whereby the integral temperature sensor is responsive to an internal temperature of said fuel cell and the multifunction heater element is disposed to heat the fuel cell.

38. The multifunction heater of claim 37, wherein said multifunction heater is embedded within at least one of the electrolyte, anode, and cathode.

39. The multifunction heater of claim 37, wherein said integral temperature sensor comprises a thermistor.

40. The multifunction heater of claim 37, wherein said integral temperature sensor is configured as a thermocouple.

* * * * *